Dec. 18, 1951 J. A. MASON 2,578,715
MAGNETICALLY CONTROLLED FRICTION CLUTCH
Filed Oct. 29, 1948 3 Sheets-Sheet 1

INVENTOR
James A. Mason
By Carlson, Pitzner, Hubbard + Wolfe
ATTORNEYS

Dec. 18, 1951  J. A. MASON  2,578,715
MAGNETICALLY CONTROLLED FRICTION CLUTCH
Filed Oct. 29, 1948  3 Sheets-Sheet 3
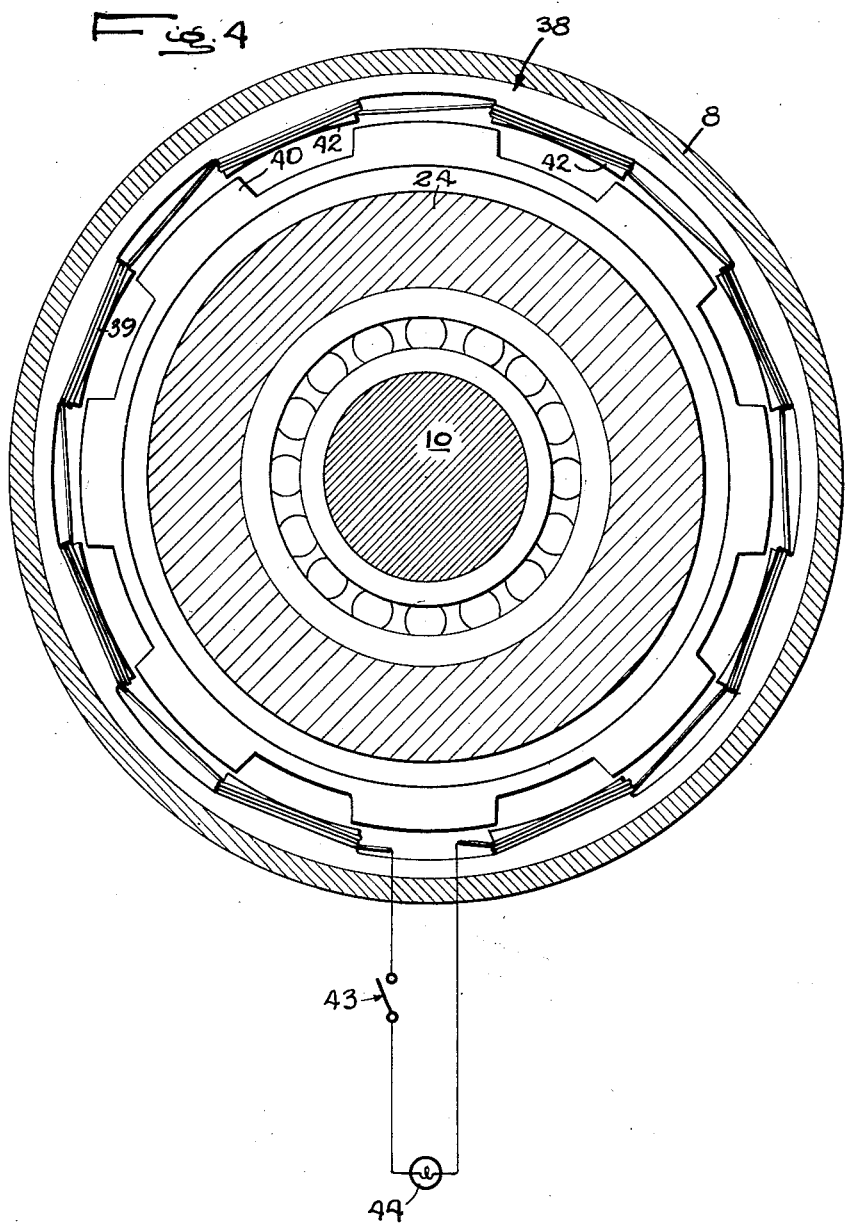
INVENTOR
James A. Mason
By Carlson, Pitzner, Hubbard & Wolfe
ATTORNEY Patented Dec. 18, 1951

2,578,715

UNITED STATES PATENT OFFICE 2,578,715

MAGNETICALLY CONTROLLED FRICTION CLUTCH

James A. Mason, Beloit, Wis., assignor to Warner Electric Brake & Clutch Company, a corporation of Illinois Application October 29, 1948, Serial No. 57,295

7 Claims. (Cl. 192—40)

This invention relates to friction clutches and more particularly to those of the type in which the force for engaging the clutch is derived from the rotation of the driving clutch element by exerting a drag on a part which normally rotates with said driving element but is rotatable relative to the latter to cause the engaging action.

The primary object is to provide an actuator for a clutch of the above character in which the force for activating the clutch is produced by magnetic action without the necessity of imposing friction on any of the parts of the drag-producing device.

Another object is to provide a drag clutch of the above character in which the magnetic action is derived from the rotation of the driving element of the clutch and without the use of an external source of energizing current.

A further object is to produce the magnetic drag by the action of an electric generator having a stationary or nonrotatable stator member coacting with a magnetic rotor which rotates with the driving clutch element and is angularly movable relative thereto to engage and release the clutch proper.

A more detailed object is to employ a generator having a permanently magnetized rotor and a nonrotatable stator with windings thereon adapted when rendered active to engage the clutch.

The invention also resides in the novel arrangement of the parts to produce a compact and self-contained clutch and actuator unit of relatively simple yet durable construction.

Other objects and advantages of the invention will become apparent from the following detailed description taken in connection with the accompanying drawings, in which Figure 1 is a longitudinal diametrical cross section of a clutch embodying the novel features of the present invention.

Fig. 4 is a cross section taken along the line 4—4 of Fig. 1.

Figure 1:
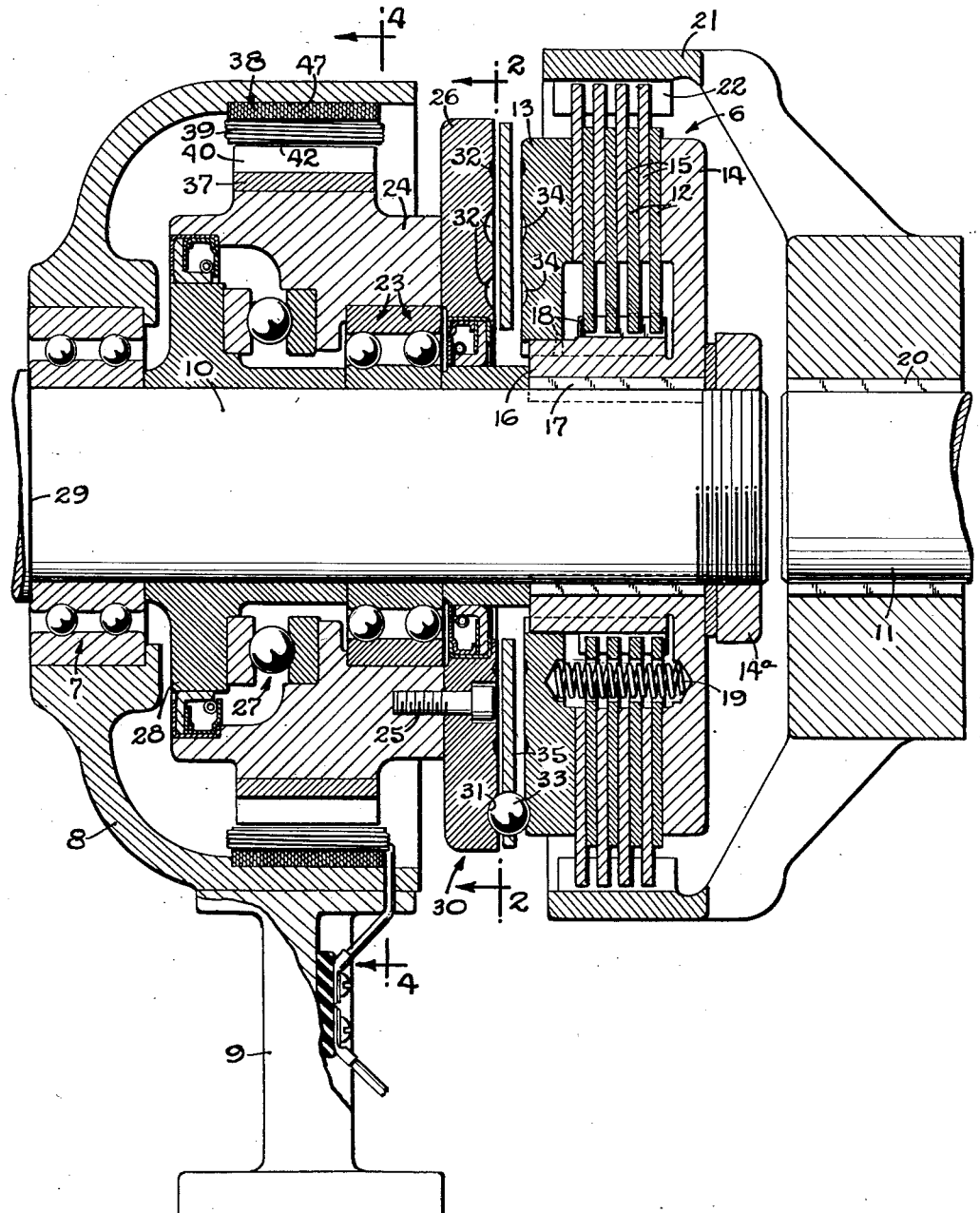
Figure 2:
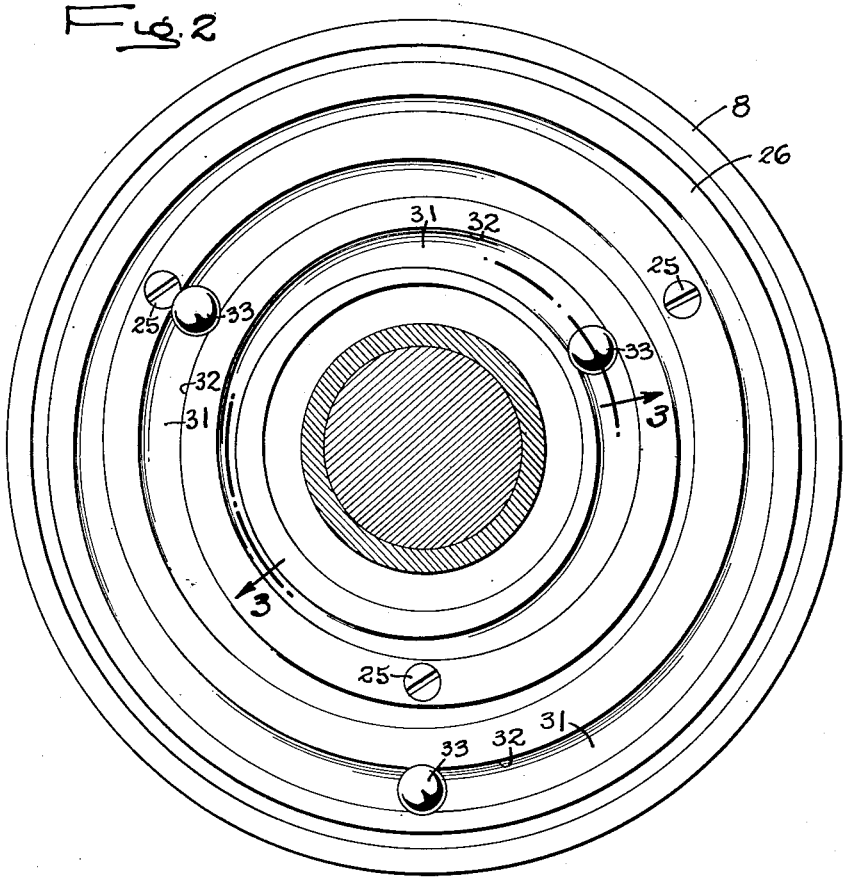
Fig. 2 is a cross section taken along the line 2—2 of Fig. 1.
Figure 3:
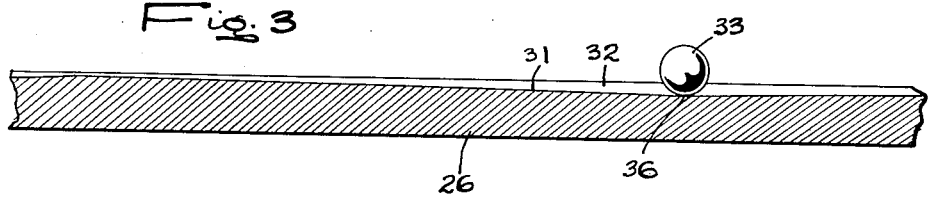
Fig. 3 is a fragmentary section taken along the arc 3—3 of Fig. 2.

While the invention is susceptible of various modifications and alternative constructions, I have shown in the drawings and will herein describe in detail the preferred embodiment. It is to be understood, however, that I do not intend to limit the invention by such disclosure but aim to cover all modifications and alternative constructions falling within the spirit and scope of the invention as expressed in the appended claims.

For purposes of illustration, the invention is shown in the drawings embodied in a so-called multiple disk friction clutch or coupling 6 for transmitting rotary power from a driving element such as a shaft 10 to a driven element such as a shaft 11. The shafts are alined with each other and journaled in suitable bearings including an antifriction bearing 7 in the hub of a housing 8 mounted on a suitable stationary support 9.

The clutch 6 is engaged by pressing into axial engagement a plurality of plates or disks 12, 13, 14 and 15 arranged coaxially and composed of suitable friction material. Herein, the disk 14 is formed with a hub 16 splined at 17 onto the driving shaft 10 and loosely spline connected at 18 to the disks 12 and 13, the disks 13 and 14 being urged apart by a plurality of annularly spaced compression springs 19. A nut 14a screwed onto the shaft 10 forms a rigid backing for the terminal disk 14.

The driven shaft 11 is keyed at 20 to the hub of a casing 21 into which the disks 15 are loosely splined as indicated at 22.

Journaled on bearings 23 on the driving shaft 10 is the hub 24 of an actuating disk 26 connected to the hub by screws 25 and disposed adjacent to but axially spaced from the terminal clutch disk 13. A thrust bearing 27 is interposed between the hub 24 and a flange 28 on a sleeve carried by the shaft 10 and backed by a shoulder 29 acting through the inner race of the bearing 7. An antifriction backing is thus formed for the actuating disk 26 which may rotate with the driving shaft 10 but is adapted to turn relative thereto in either direction away from a normal clutch-released position.

Through a force augmenting connection 30, angular motion of the disk 26 relative to the driving shaft 10 is converted into axial movement of the terminal clutch plate 13 thereby compressing the driving and driven clutch plates together to engage the clutch 6. To obtain a substantial mechanical advantage and minimize friction between its parts, this connection 30 includes elongated circumferentially sloping cam surfaces 31 constituting the bottoms of a plurality of grooves 32 formed in the face of the disk 26 and coacting with balls 33 that roll in grooves 34 in the opposed face of the terminal clutch disk 13. Preferably, the balls are held angularly spaced by a cage 35 and the grooves 32 and 34 are concentric with each other and the clutch axis. The cam surfaces 31, which may thus extend substantially throughout a full revolution in the case of a unidirectional clutch, rise gradually and circumferentially from low points 36 in which the respective balls are seated when the disk 26 is turned relative to the driving shaft to a normal clutch-released position. Whenever the actuating disk 26 is free, it is maintained in this clutch-released position by the action of the springs 19 acting backwardly through the antifriction cam connection.

Electrically energized and selectively operable means is provided for exerting a magnetic drag or torque on the actuating disk 26 to hold the latter back and thus cause relative turning between the disk and the driving shaft 10 and actuation of the cam mechanism to engage the clutch 6. While various types of electrical means may be employed to produce such a frictionless drag, it is preferred to employ an electric generator having a rotor 37 which is secured to and rotates in unison with the clutch actuating disk 26 and a stator 38 which encircles the driving shaft 10 and is mounted stationarily on the supporting frame 8 of the clutch. Thus, the electric current for producing magnetic drag is derived from rotation of the driving clutch element instead of from an external source.

To avoid the necessity of using slip rings or the like, the rotor 37 constitutes the generator field member which is permanently magnetized. To this end, the outwardly projecting angularly spaced pole pieces 40 are fashioned from a ring pressed onto the hub 24 and composed of material having a high degree of retentivity. Alnico is a suitable material and may be readily polarized to produce a permanent magnetic field.

The stator 38, which constitutes the armature of the generator, comprises a laminated ring-shaped core 47 with inwardly projecting pole pieces 42 around which are coiled windings 39 connected in series with the windings of adjacent poles wound oppositely so as to be oppositely polarized. The core 47 is pressed into the cylindrical part of the stationary casing 8 which, together with the hub 24, may be cast from nonmagnetic material.

With the generator thus constructed, it will be apparent that, when the windings 39 are open-circuited while the driving shaft is turning, no current will be generated and the generator will remain inactive. The actuating disk 26 is thus free and turns with the driving shaft 10 while being held by the springs 19 in clutch-released position (Fig. 1) relative to the shaft. The generator is activated to impose a magnetic drag on the disk 26 simply by closing the circuit through the windings 39 which preferably are connected in series. Alternating current is thus generated in the windings and the magnitude of the magnetic drag exerted on the actuating disk will be proportional to the speed of the driving shaft and inversely proportional to the resistance of the winding circuit.

Under the magnetic drag thus imposed, the disk 26 is held back and the clutch disk 13 turns ahead resulting in relative angular motion between the two disks with a force which is derived from motion of the driving clutch element or shaft 10 and is proportional in magnitude to the magnetic drag produced by the generator. As a result of this motion, the balls 33 roll up the cam inclines 31 separating the disks 13 and 26 and forcing the disk 13 axially to compress the clutch plates into frictional gripping engagement with a force determined by the magnetic drag torque multiplied by the mechanical advantage of the cam mechanism. The shafts 10 and 11 are thus coupled frictionally to transmit a corresponding amount of power.

When the generator is again disabled by interrupting the circuit through the windings 39, the disk 26 is freed and the springs 19, acting backwardly through the ball cam mechanism, turn the disk reversely to released position. The clutch is thus released and the shafts 10 and 11 are uncoupled.

The circuit for rendering the generator operative and inoperative may be controlled in various ways depending on operating conditions. For example, where it is unnecessary to vary the degree of engagement of the clutch, the circuit for the generator windings may be closed by a simple switch 43 which may under certain conditions such as for slow speed operation actually short circuit the windings. For most applications, however, the circuit will include a resistance 44 having the required heat dissipating characteristics. The inherent magnetic inductance of the stator windings retards the attainment of full energization of the generator and thus prevents too sudden engagement of the clutch 6.

To avoid undue delay in the attainment of full engagement of the clutch, provision is made for initially applying to the windings a greater voltage than is required for normal operation and then immediately and automatically decreasing the circuit resistance to the proper value. One way of accomplishing this is to employ a resistance element such as an incandescent lamp whose resistance is relatively low when the filament is cold and decreases over a wide range as a result of the substantial temperature increase which occurs immediately following energization. Thus, the lamp selected would be adapted to provide the desired resistance after heating. If the degree of engagement of the clutch is to be varied, other means such as a variable resistor would be included in the energizing circuit.

It will be apparent that the magnetic clutch actuator described above responds quickly to closure of a circuit through armature windings 39 which are mounted in the stator or outer part of the generator and thus adapted for rapid dissipation of the heat resulting from operation of the generator. A generator of minimum size may thus be used. Location of the generator windings in the stator is also advantageous in that the necessity for slip rings is avoided.

The parts of the drag-producing device are mechanically disconnected and remain in the same relation during engagement and disengagement of the main clutch. Wear on the parts and variations in the actuating force due to friction or other causes are eliminated. As a result of these characteristics, it is possible to obtain a powerful yet accurately controllable clutching action in response to a very small control force.

Also, the operation of the clutch actuator is unaffected by lubricant which may come onto its parts or in which the clutch as a whole may be submerged in certain installations. This is because the action of the actuator is purely magnetic and does not involve friction or the use of any materials affected by ordinary lubricants.

I claim as my invention:

1. The combination of, driving and driven shafts arranged end to end, a friction clutch having axially engageable friction elements mounted on the adjacent ends of the respective shafts and normally held out of gripping engagement, a disk axially spaced from said clutch and mounted on said driving shaft for rotation relative thereto, said disk being normally rotatable with said driving shaft, a force augmenting connection operable to compress said elements together in response to turning of said disk relative to said driving shaft away from a predetermined released position, an electric generator axially spaced from said clutch and having a rotor rigid with said disk and a nonrotatable stator encircling said driving shaft and coacting with said rotor to exert a magnetic drag on said rotor and member, and means for rendering said generator operative and inoperative to engage and disengage said clutch.

2. An actuator for a friction clutch having axially engageable driving and driven elements, a member axially spaced from the clutch and mounted on said driving element for angular displacement relative thereto about the clutch axis, said member being normally rotatable with said driving element, means including a force augmenting connection between said member and said driving clutch element, said means being operable upon turning of said member respectively away from and back toward a normal clutch-released position to shift said driving clutch element axially to engage said clutch or to permit retraction of the element to release the clutch, and an electric generator adapted to be rendered operative selectively to impose a frictionless drag on said member, said generator comprising a nonrotatable wound stator and a permanently magnetized rotor rigid with said member and disposed closely adjacent the latter.

3. The combination of, driving and driven shafts, a friction clutch having axially engageable friction elements mounted on the respective shafts, spring means normally separating said elements, a disk normally rotatable with said driving shaft and adapted for rotation relative thereto, a force augmenting connection operable to compress said elements together in response to turning of said disk away from a predetermined released position, and an electric generator having a permanent magnet rotor rotatable with said disk and a nonrotatable stator having windings adapted to be close circuited to initiate action of said generator in exerting a magnetic drag on said rotor for retarding the turning thereof.

4. The combination of, driving and driven shafts, a clutch having frictionally engageable elements respectively rotatable with said shafts, a member normally rotatable with said driving shaft and mounted for rotation relative thereto, a connection between said member and said clutch operable in response to rotation of the member in one direction relative to said driving shaft to apply the clutch, permanently magnetized poles on said member, and a stator having windings and poles coacting with said first-mentioned poles to form an electric generator operable when said windings are close circuited to retard the rotation of said member.

5. The combination of, driving and driven shafts, a friction clutch coupling said shafts and having axially engageable driving and driven elements, a member normally held in a predetermined angular position relative to said driving shaft and adapted for angular displacement relative thereto, means actuated in response to angular displacement of said member relative to said driving shaft to force said clutch elements into axial gripping engagement, and an electric generator having a nonrotatable wound stator and a permanently magnetized rotor rotatable with said member, said generator being operable, when rendered active, to impose a magnetic drag on said member.

6. The combination of, driving and driven shafts, a friction clutch coupling said shafts and having driving and driven elements adapted for axial gripping engagement, a member journaled on said driving shaft but normally rotatable therewith, said member being axially spaced from said clutch, a thrust bearing holding said member against movement along said driving shaft away from the clutch, a force augmenting connection for transmitting the motion of said member relative to said driving shaft to said clutch to engage or release the latter, spring means normally holding said member in a clutch-released position when the member is free, and nonrotatably mounted magnetic means adapted when inactive to free said member for rotation with said driving shaft and when activated to exert a magnetic drag on said member.

7. The combination of, driving and driven shafts, a clutch having frictionally engageable elements respectively rotatable with said shafts, a member normally rotatable with said driving shaft and mounted for rotation relative thereto, a connection between said clutch and said member operable in response to rotation of the member in opposite directions relative to said driving shaft to apply and release said clutch, and an electric generator comprising a continuously magnetized rotor rotatable in unison with said member and a non-rotatable stator having a winding thereon adapted when short circuited and without external excitation to impose a magnetic drag on said rotor and said member.

JAMES A. MASON.

REFERENCES CITED

The following references are of record in the file of this patent:

UNITED STATES PATENTS

| Number | Name | Date |
| --- | --- | --- |
| 1,974,390 | Eason | Sept. 18, 1934 |
| 2,061,787 | Warner | Nov. 24, 1936 |
| 2,091,270 | Colman | Aug. 31, 1937 |
| 2,374,688 | La Brie | May 1, 1945 |